United States Patent
Mueller

[15] 3,684,792
[45] Aug. 15, 1972

[54] NEW WATER-INSOLUBLE AZO-COMPOUNDS CONTAINING A CARBOXAMIDO-CARBOSTYRIL GROUP

[72] Inventor: Willy Mueller, Fuerfelderstrasse 55, Riehen, Switzerland

[22] Filed: Sept. 3, 1959

[21] Appl. No.: 855,028

[30] Foreign Application Priority Data

Sept. 5, 1969   Switzerland............13326/68

[52] U.S. Cl..............260/155, 106/19, 106/288 Q, 117/123 C, 117/138.8 R, 117/138.8 B, 117/138.8 E, 117/138.8 UA, 117/139, 260/288 R, 260/288 E, 260/556 B, 260/558 R, 260/558 D, 260/999
[51] Int. Cl. ......C09b 29/20, C09b 29/22, D06p 3/00
[58] Field of Search........................................260/155

[56] References Cited

UNITED STATES PATENTS 2,754,293   7/1956   Brody et al................260/155
2,781,345   2/1957   Leavitt et al...........260/155 X
3,137,685   6/1964   Buckley et al............260/155
3,532,520   10/1970  Dawson et al. ........260/155 X

*Primary Examiner*—Floyd D. Higel
*Attorney*—Harry Goldsmith, Joseph G. Kolodny and Mario A. Monaco

[57] ABSTRACT

Water insoluble azo dyestuff pigments of the formula $$R_1 - N = N - R_2 - CONHR_3 \quad (1)$$

in which $R_1$ represents an aromatic or heterocyclic residue, $R_2$ is a hydroxynaphthalene residue, in which the azo, hydroxyl and carboxylic acid amide groups are in the 1,2,3-positions, or $R_2$ represents the residue of an enolisable or enolised ketomethylene compound, and $R_3$ represents a carbostyril residue. They are useful for coloring laqueurs and plastic masses in yellow to red shades fast to light and migration.

7 Claims, No Drawings

NEW WATER-INSOLUBLE AZO-COMPOUNDS CONTAINING A CARBOXAMIDO-CARBOSTYRIL GROUP

The present invention provides valuable water-insoluble azo dyestuff pigments of the general formula $$R_1 - N = N - R_2 - CONHR_3 \quad (1)$$

in which $R_1$ represents an aromatic or heterocyclic residue, $R_2$ is a hydroxynaphthalene residue, in which the azo, hydroxyl and carboxylic acid amide groups are in the 1, 2, 3-positions, or $R_2$ represents the residue of an enolisable or enolised ketomethylene compound, and $R_3$ represents a carbostyril residue.

The present invention also provides a process for preparing the water-insoluble azo dyestuff pigments of the general formula 1, which comprises a. condensing a carboxylic acid halide of the formula $$R_1 - N = N - R_2 - COHal$$

in which $R_1$ and $R_2$ have the meanings given above and Hal represents a halogen atom, with an amino-carbostyril, or b. coupling a diazo- or diazo-amino-compound of an amine of the formula $$R_1NH_2$$

where $R_1$ has the meaning given above, with a coupling component of the formula $$R_2CONH-R_3$$

in which $R_2$ and $R_3$ have the meanings given above.

As the dyestuffs of the invention are pigments, it will be understood that groups imparting solubility in water, especially acid groups imparting solubility in water, for example, sulphonic acid or carboxylic acid groups, are excluded as substituents.

Of special interest are dyestuffs of the formula

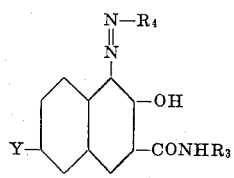

in which $R_4$ represents a benzene residue, $R_3$ represents a carbostyril residue, and Y represents a hydrogen or halogen atom or an alkoxy, nitro or cyano group. These dyestuffs preferably correspond to the formula

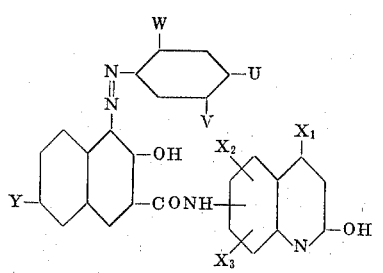

in which W represents a halogen atom or an alkyl, alkoxy, phenoxy, nitro or carboxylic acid ester group, U represents a hydrogen or halogen atom or a nitro or trifluoromethyl group, V represents a hydrogen or halogen atom or a trifluoromethyl, carboxylic acid amide or sulphonic acid amide group, and may be further represented as W represents chloro, bromo, fluoro, lower alkyl, lower alkoxy, carboethoxyphenoxy, phenoxy, chlorophenoxy, nitro or $C_{1-2}$lower carbalkoxy, U represents hydrogen, methoxy, ethoxy, carbophenoxy, carboxamido, methyl, chloro, bromo, nitro or trifluoromethyl, and V represents hydrogen, chloro, bromo, methyl, nitro, methoxy, $C_{1-2}$carbalkoxy, carbophenoxy, carboxamido, N-$C_{1-2}$alkyl carboxamido, trifluoromethyl, unsubstituted carboxylic phenylamido, substituted carboxylic phenylamido wherein the substitutents are selected from the group consisting of chloro, methyl, phenyl and trifluoromethyl; sulfonamido, sulfonic ethylamido, sulfonic phenylamido, substituted sulfonic phenylamido wherein the substituents are selected from the group consisting of chloro and trifluoromethyl. $X_1$ represents a hydrogen atom or an alkyl or phenyl group, $X_2$ and $X_3$ each represents a hydrogen or halogen atom or an alkyl, phenyl or alkoxy group, and Y has the meaning given above, and in which the NH-group is bound in the 6- or 7-position of the carbostyril residue.

Also of interest are the dyestuffs of the formula

especially those of the formula

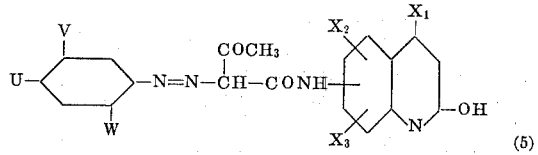

in which $R_3$, $R_4$, U, V, W, $X_1$, $X_2$ and $X_3$ have the meanings given above, or those of the formula

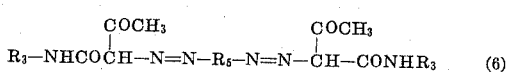

and especially those of the formula

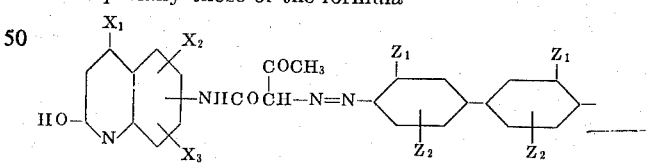

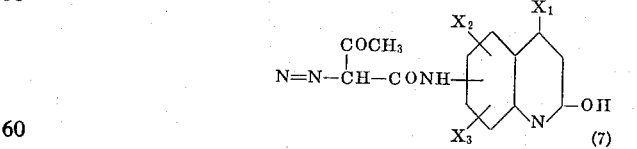

in which $R_5$ represents a diphenyl residue, $Z_1$ and $Z_2$ each represents a hydrogen or halogen atom or an alkyl or alkoxy group, and $R_3$, $X_1$, $X_2$ and $X_3$ have the meanings given above.

The dyestuffs of the formula (2) are advantageously obtained by condensing an azo-dyestuff-carboxylic acid chloride of the formula

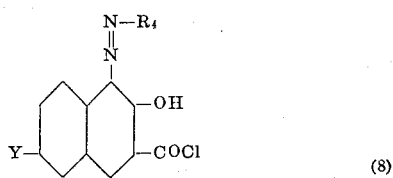

with an amino-carbostyril.

The azo-dyestuff-carboxylic acids, from which the acid chlorides of the formula (8) are made, are obtained by coupling a diazo-compound of an amine of the formula $R_4-NH_2$ with a 2,3-hydroxynapthoic acid of the formula

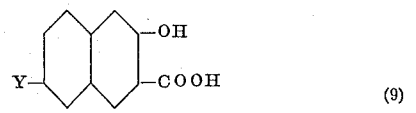

As examples of diazotisable amines of the formula $R_1-NH_2$ there may be mentioned the following:

Aniline and especially halogenated anilines, such as

2-, 3- or 4-chloraniline,
2,4-dichloraniline,
2,3-dichloraniline,
2,5-dichloraniline,
3,4-dichloraniline,
2,6-dichloraniline,
2,4,5-trichloraniline,
2,4,6-trichloraniline,
2-, 3- or 4-bromaniline,
2,4-dibromaniline,
2,5-dibromaniline,
2-fluoraniline,
2-methyl-3-chloraniline
2-methyl-4-chloraniline,
2-methyl-5-chloraniline,
3-trifluoromethylaniline,
3,5-di-trifluoromethylaniline,
2-chloro-5-trifluoromethylaniline,
4-chloro-2-trifluoromethylaniline,
4-chloro-3-trifluoromethylaniline,
2-methoxy-5-trifluoromethylaniline,
and also nitranilines, such as
2-, 3- or 4-nitraniline,
2,4-dinitraniline,
4-chloro-2-nitraniline,
2-chloro-4-nitraniline,
2,5-dichloro-4-nitraniline,
4-methyl-3-nitraniline,
4-methyl-2-nitraniline,
2-methyl-5-nitraniline,
2-methyl-4-nitraniline,
2,4-dimethyl-3-nitraniline,
and also alkoxy- and phenoxy-anilines, such as
2- and 4-methoxyaniline,
2- and 4-ethoxyaniline,
2,4-dimethoxyaniline,
2,5-dimethoxyaniline,
2-methoxy-5-chloraniline,
2-methoxy-5-nitraniline,
3-chloro-4-methoxyaniline,
2-methoxy-4-nitraniline,
2-nitro-4-methoxyaniline,
2-nitro-5-methoxyaniline,
2-nitro-4-ethoxyaniline,
5-nitro-4-methyl-2-methoxyaniline,
2-methoxy-4-chloro-5-methylaniline,
2,4-dimethoxy-5-chloraniline,
2,5-dimethoxy-4-chloraniline,
2-amino-4-chlorodiphenyl ether,
2-amino-2',4-dichlorodiphenyl ether,
2-amino-4,4'-dichlorodiphenyl ether,
2-amino-4-trifluoromethyl-diphenyl ether,
2-amino-4-trifluoromethyl-4'-chlorodiphenyl ether,
4-amino-2-trifluoromethyl-diphenyl ether,
and also
4-amino-3-nitrobenzotrifluoride,
2-amino-5-nitrobenzotrifluoride,
2-amino-benzoic acid methyl ester,
2-amino-benzoic acid ethyl ester,
4-chloro-3-aminobenzoic acid methyl ester,
4-methyl-3-aminobenzoic acid ethyl ester,
4-methoxy-3-aminobenzoic acid methyl ester,
2-amino-5-nitro-benzoic acid methyl ester,
3-amino-benzoic acid phenyl ester,
4-amino-benzoic acid phenyl ester,
4-amino-4'-diphenyl-carboxylic acid ethyl ester,
2-amino-diphenyl sulphone,
4-methoxy-3-aminobenzene-1-benzyl sulphone,
4-methoxy-3-aminobenzene-1-ethyl sulphone,
and also
3-amino-benzoic acid amide,
4-amino-benzoic acid amide,
4-chloro-3-aminobenzoic acid amide,
4-methyl-3-aminobenzoic acid amide,
4-methyl-3-amino-benzoic acid-N-methylamide,
4-methyl-3-aminobenzoic acid-N-diethylamide,
4-amino-3-methylbenzoic acid amide,
4-methoxy-3-amino-benzoic acid amide,
4-methoxy-3-amino-benzoic acid-N-methylamide,
4-chloro-3-amino-benzoic acid anilide,
4-chloro-3-amino-benzoic acid-4'-chloranilide,
4-chloro-3-amino-benzoic acid-2',4'-dichloranilide,
4-chloro-3-amino-benzoic acid-2',4',5'-trichloranilide,
4-chloro-3-amino-benzoic acid-3'-trifluoromethylanilide,
4-chloro-3-amino-benzoic acid-2'-chloro-5'-trifluoromethylanilide,
2,4-dichloro-5-amino-benzoic acid anilide,
2,4-dichloro-5-amino-benzoic acid-3'-chloranilide,
2,4-dichloro-5-amino-benzoic acid-2',4'-dichloranilide,
2,4-dichloro-5-amino-benzoic acid-2',5'-dichloranilide,
2,4-dichloro-5-amino-benzoic acid-3'-trifluoromethylanilide,
2,4-dichloro-5-amino-benzoic acid-2'-chloro-5'-trifluoromethylanilide,
5-amino-4-methoxy-2-chloro-benzoic acid-3'-trifluoromethylanilide,
4-methyl-3-amino-benzoic acid anilide, 4-methyl-3-amino-benzoic acid-3'-trifluoromethylanilide,
4-methyl-3-amino-benzoic acid-3'-chloranilide,
4-methyl-3-amino-benzoic acid-2',4'-dichloranilide,
4-amino-3-methyl-benzoic acid anilide,
4-amino-3-methyl-benzoic acid-4'-chloranilide,
4-amino-3-methyl-benzoic acid-3'-trifluoromethylanilide,
4-methoxy-3-amino-benzoic acid-3'-trifluoromethylanilide,
4-methoxy-3-amino-benzoic acid-2'-chloro-5'-trifluoromethylanilide,
4-methoxy-3-amino-benzoic acid anilide,
4-methoxy-3-amino-benzoic acid-3',5'-ditrifluoromethylanilide,
4-methoxy-3-amino-benzoic acid-2',5'-dichloranilide,
4-amino-4'-diphenyl-carboxylic acid anilide,
4-carbomethoxy-3-amino-benzoic acid anilide,
4-carbomethoxy-3-amino-benzoic acid-2',4'-dichloranilide,
4-carbomethoxy-3-amino-benzoic acid-4'-methylanilide,
4-methoxy-3-amino-benzene-sulpho-N-diethylamide,
4-methoxy-3-amino-benzene-sulphonic acid anilide,
4-methoxy-3-amino-benzene-sulphonic acid-2',5'-dichloranilide,
4-chloro-3-amino-benzene-sulphonic acid anilide,
4-chloro-3-amino-benzene-sulphonic acid-2'-chloro-5'-trifluoromethylanilide.

The azo-dyestuff-carboxylic acid so obtained is treated with an agent capable of converting a carboxylic acid into its halide, for example, chloride or bromide. Thus, there may be used, especially a phosphorus halide, for example, phosphorus pentabromide or phosphorus trichloride or pentachloride, a phosphorus oxyhalide, and preferably thionyl chloride.

The treatment with the acid halide-forming agent is advantageously carried out in an inert organic solvent, for example, dimethylformamide, a chlorobenzene, for example, mono- or di-chlorobenzene, toluene, xylene or nitrobenzene, and, in the case of the five last mentioned compounds, optionally in the presence of dimethylformamide.

In the preparation of the carboxylic acid halides it is generally of advantage first to dry the azo-compound that has been produced in an aqueous medium, or to free it from water azeotropically by boiling it in an organic solvent. The azeotropic drying may, if desired, be carried out immediately before the treatment with the acid halide-forming agent.

The azo-dyestuff-carboxylic acid chloride so obtained is then condensed with an amino-carbostyril, preferably one of the formula

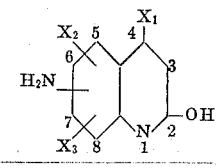

(10)

in which $X_1$, $X_2$ and $X_3$ have the meanings given above, and in which the amino group is in the 6- or 7-position.

As examples of amino-carbostyrils there may be mentioned the following:
6-aminocarbostyril,
7-aminocarbostyril,
4-methyl-7-aminocarbostyril,
4,6-dimethyl-7-aminocarbostyril,
4,5-dimethyl-7-aminocarbostyril,
4,5,8-trimethyl-7-aminocarbostyril,
4-methyl-6-methoxy-7-aminocarbostyril,
4,6,8-trimethyl-7-aminocarbostyril,
4-phenyl-7-aminocarbostyril,
4-methyl-6-aminocarbostyril,
4-methyl-7-chloro-6-aminocarbostyril,
4-methyl-6-chloro-7-aminocarbostyril,
4,7-dimethyl-6-aminocarbostyril,
4,5,8-trimethyl-6-aminocarbostyril,
4-methyl-7-methoxy-6-aminocarbostyril,
4-methyl-5,8-dimethoxy-6-aminocarbostyril,
4-methyl-5,8-dimethoxy-6-aminocarbostyril,
4-methyl-6-amino-7,8-benzo-carbostyril.

The condensation of the carboxylic acid chloride of the kind defined above with the amino-carbostyril is advantageously carried out in an anhydrous medium at an elevated temperature, preferably in the presence of an organic solvent, for example, toluene, monochlorobenzene, dichlorobenzene, trichlorobenzene, nitrobenzene or especially N-methylpyrrolidone.

An acid-binding agent, for example, anhydrous sodium acetate or pyridine, may be added. Some of the dye-stuffs obtained are crystalline and others are amorphous, and they are generally obtained in a very good yield and in a pure state. It is of advantage first to separate the acid chloride obtained from the carboxylic acid. In some cases the separation of the acid chloride may be dispensed with without harm, and then the condensation may immediately follow the preparation of the carboxylic acid chloride.

The dyestuffs of the formula (2) can also be obtained by coupling a diazo-compound of an amino-benzene of the formula $R_4$—$NH_2$ with a naphthol of the formula

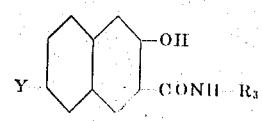

The dyestuffs of the formula (4) are obtained advantageously by coupling a diazotised amino-benzene with an acetoacetylamino-carbostyril, especially one of the formula

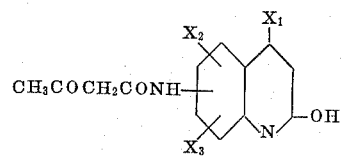

in which $X_1$, $X_2$ and $X_3$ have the meanings given above.

Finally, the dyestuffs of the formula (6) are also best obtained by the coupling process, namely by coupling a diazotised diamino-diphenyl, especially one of the formula

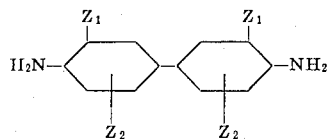

in which $Z_1$ and $Z_2$ have the meanings given above, with the appropriate acetoacetyl-amino-carbostyril in the molar ratio 1:2.

The coupling is advantageously carried out by the gradual addition of an aqueous alkaline solution of the coupling component to the acid solution of the diazonium salt. The alkali metal hydroxide for dissolving the coupling component is advantageously used in an amount sufficient to neutralize the mineral acid liberated from the diazonium salt during the coupling. The coupling is advantageously carried out at a pH-value of within the range of from 4 to 6. It is of advantage to adjust the pH-value by the addition of a buffer. As buffers there may be used, for example, salts, especially alkali metal salts, of formic acid, phosphoric acid or especially acetic acid. The alkaline solution of the coupling component advantageously contains a wetting, dispersing or emulsifying agent, for example, an aralkyl sulphonate, for example, dodecyl-benzene sulphonate or the sodium salt of 1,1'-naphthyl-methane sulphonic acid, a polycondensation product of an alkylene oxide, for example, the reaction product of ethylene oxide on para-tert.-octylphenol, and also an alkyl ester of a sulpho-ricinoleate, for example, n-butyl sulpho-ricinoleate. The dispersion of the coupling component may with advantage also contain a protective colloid, for example, methyl-cellulose, or a small amount of an inert organic solvent that is sparingly soluble or insoluble in water, for example, an aromatic hydrocarbon that may be halogenated or nitrated, for example, benzene, toluene, xylene, chlorobenzene, a dichlorobenzene or nitrobenzene, or a halogenated aliphatic hydrocarbon, for example, carbon tetrachloride or trichlorethylene, or a water-miscible organic solvent, for example, acetone, ethylene glycol monomethyl ether, methyl ethyl ketone, methanol, ethanol, isopropanol or dimethylformamide.

The coupling may also be carried out with advantage by continuously mixing an acid solution of the diazonium salt with an alkaline solution of the coupling component in a mixing nozzle, it being of advantage to use a small excess of the coupling component. Care should be taken that the diazo-component and the coupling component are present in equimolecular proportions in the mixing nozzle, but a small excess of the coupling component is advantageous. This can be effected in a very simple manner by controlling the pH-value of the liquid in the mixing nozzle. Attention is also paid to thorough stirring of the two solutions in the mixing nozzle. The resulting dyestuff dispersion is continuously withdrawn from the mixing nozzle, and the dyestuff is separated by filtration.

The new pigment dyestuffs can also be obtained by heating a diazo-amino-compound containing the residue $R_1$ with the coupling component in an organic solvent, optionally in an aqueous-organic solvent, preferably in the presence of an acid.

The aryl diazo-amides to be used in the process are obtainable by methods known per se by the condensation of an aryl diazonium salt with a primary or preferably secondary amine. For this purpose there is suitable a very wide variety of amines, for example, aliphatic amines, for example, methylamine, ethylamine, ethanolamine, propylamine, butylamine, hexylamine and especially dimethylamine, diethylamine, diethanolamine, methyl-ethanolamine, dipropylamine or dibutylamine, amino-acetic acid, methylamino-acetic acid, butylaminoacetic acid, amino-ethane sulphonic acid, methylamino-ethane sulphonic acid, guanylamino-ethane sulphonic acid, β-amino-ethyl sulphuric acid, alicyclic amines, for example, cyclohexylamine, N-methyl-cyclohexylamine, dicyclohexylamine, aromatic amines, such as 4-aminobenzoic acid, sulphanilic acid, 4-sulpho-2-aminobenzoic acid, (4-sulphophenyl)-guanidine, 4-N-methylamino-benzoic acid, 4-ethylamino-benzoic acid, 1-aminonaphthalene-4-sulphonic acid, 1-aminonaphthalene-2,4-di-sulphonic acid, heterocyclic amines, for example, piperidine, morpholine, pyrrolidine, dihydroindole, and finally also sodium cyanamide or dicyandiamide.

The diazo-amino-compounds so obtained are usually sparingly soluble in water, and they can, after being salted out in crystalline form, be separated from the reaction medium. In many cases the moist press cake can be used for the further reaction. In certain cases it is of advantage to free the diazo-amide from water by vacuum drying, before the reaction.

The coupling of the diazo-amino-compound with the naphthol is effected in an inert organic solvent, for example, chlorobenzene, ortho-dichlorobenzene, nitrobenzene, pyridine, ethylene glycol, ethylene glycol monomethyl or monoethyl ether, dimethylformamide, formic acid or acetic acid. When a water-miscible solvent is used it is not necessary to use the diazo-amino-compound in an anhydrous form. For example, the moist aqueous filter cakes may be used. The splitting of the diazo-amino-compound, which precedes the coupling, takes place in an acid medium. If a neutral solvent is used, it is therefore necessary to add an acid, for example, hydrogen chloride, sulphuric acid, formic acid or acetic acid.

The coupling is preferably carried out with the aid of heat, and advantageously at a temperature within the range of from 80° to 180° C, and it generally proceeds very rapidly and completely.

Owing to their insolubility the pigments so obtained can be isolated from the reaction mixtures by filtration. As by-products remain in solution, the pigments are obtained in an excellent state of purity. In the case of pigments that have been obtained by an aqueous coupling method, an after-treatment with organic solvents is necessary. Further advantages of the process of the invention are the high yields obtained, the favorable pigmentary form of the products, and the constancy of the properties of the pigments obtained.

The pigments of the invention, owing to their favorable properties, are suitable for a very wide variety of pigment applications, for example, in finely dispersed form for coloring high-molecular materials, for example, cellulose ethers or esters or polyamides or polyurethanes or polyesters, lacquers or lacquer-formers, solutions or products of acetyl-cellulose, nitrocellulose, or natural resins or synthetic resins, such as polymerization resins or condensation resins, for example aminoplasts, alkyd resins, phenoplasts, polyolefines, for example, polystyrene, polyvinyl chloride, polyethylene, polypropylene, polyacrylonitrile, or rubber, casein, silicone or silicone resins. They can also be used with advantage in the manufacture of colored crayons, cosmetic preparations or laminated boards.

The following Examples illustrate the invention, the parts being by weight unless otherwise stated, and the relationship of parts by weight to parts by volume being the same as that of the kilogram to the liter:

EXAMPLE 1.

36.1 parts of the dyestuff, obtained by coupling diazotised 2,5-dichloraniline with 2,3-hydroxynaphthoic acid, are treated in 150 parts by volume of ortho-dichlorobenzene with 10 parts of thionyl chloride for 3 hours at 110° to 120° C. The dyestuff acid chloride that crystallizes as lustrous red needles after cooling is filtered off, washed with benzene and then with petroleum ether, and dried in vacuo at 40° to 45° C. There are obtained about 34 parts of the chloride, corresponding to 89.7 percent of the theoretical yield.

4.2 parts of 4-methyl-6-chloro-7-aminocarbostyril are dissolved in 150 parts by volume of N-methyl-pyrrolidone, and 5.6 parts of the dyestuff acid chloride obtained as described above are introduced at room temperature. The whole is stirred at room temperature for 10 hours, and is then diluted with 150 parts by volume of ortho-dichlorobenzene and heated to 140° to 145° C. After one hour the whole is filtered while hot, and washed with hot dichlorobenzene until the filtrate running out is completely colorless. The filter residue is then washed with methanol and finally with hot water. By drying the filter residue in vacuo at 90° to 100° C., there are obtained 9.8 parts, corresponding to 89 percent of the theoretical yield, of a dark red powder. The pigment corresponds to the formula

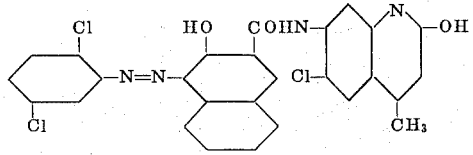

By rolling this dyestuff into polyvinyl chloride, there is obtained a strong bluish red coloration of excellent fastness to migration and very good fastness to light.

In the following Table are given further pigment dyestuffs that can be obtained in the manner described above, by coupling the diazo-bases mentioned in column I with 2,3-hydroxynaphthoic acids, converting the resulting azo-dyestuff-carboxylic acids into their acid chlorides, and condensing the latter with the aminocarbostyrils mentioned in column II. In column III are given the tints of polyvinyl chloride films colored with the pigments.

TABLE

| | I | II | III |
|---|---|---|---|
| 1 | 2,5-dichloroaniline | 4-methyl-7-aminocarbostyril | scarlet |
| 2 | " | 4,6-dimethyl-7-aminocarbostyril | red-brown |
| 3 | " | 4-methyl-6-methoxy-7-aminocarbostyril | red |
| 4 | 2,4,5-trichloraniline | 4-methyl-6-chloro-7-aminocarbostyril | blue-red |
| 5 | " | 4,6-dimethyl-7-aminocarbostyril | brown |
| 6 | " | 4-methyl-7-aminocarbostyril | scarlet |
| 7 | " | 4-methyl-7-chloro-6-aminocarbostyril | brown |
| 8 | 2,5-dichloraniline | 4,7-dimethyl-6-aminocarbostyril | brown |
| 9 | " | 4-methyl-6-amino-7,8-benzo-carbostyril | violet-brown |
| 10 | 2-chloro-5-trifluoromethyl-aniline | 4-methyl-7-chloro-6-aminocarbostyril | orange |
| 11 | " | 4-methyl-6-chloro-7-aminocarbostyril | scarlet |
| 12 | 37 | 4,6-dimethyl-7-aminocarbostyril | orange |
| 13 | 2-nitro-4-trifluoromethylaniline | 4-methyl-7-aminocarbostyril | scarlet |
| 14 | " | 4-methyl-6-chloro-7-amino carbostyril | orange |
| 15 | " | 4,6-dimethyl-7-aminocarbostyril | scarlet |
| 16 | " | 4-methyl-6-methoxy-7-aminocarbostyril | brown |
| 17 | 2-amino-benzoic acid methyl ester | 4-methyl-7-aminocarbostyril | scarlet |
| 18 | 2-amino-benzoic acid methyl ester | 4-methyl-6-chloro-7-aminocarbostyril | red |
| 19 | " | 4,6-dimethyl-7-aminocarbostyril | red |
| 20 | " | 4-methyl-6-methoxy-7-aminocarbostyril | red |
| 21 | 2-amino-benzoic acid ethyl ester | 4-methyl-7-chloro-6-aminocarbostyril | red |
| 22 | " | 4-methyl-5,6-benzo-7-aminocarbostyril | grey-violet |
| 23 | 4-chloro-2-amino-di-phenyl ether-4'-carboxylic acid ethyl ester | 4-methyl-7-chloro-6-aminocarbostyril | red |
| 24 | 2-amino-4-trifluoromethyl-4'-chlorodiphenyl ether | 4-methyl-6-chloro-7-aminocarbostyril | scarlet |
| 25 | " | 4-methyl-7-chloro-6-aminocarbostyril | scarlet |
| 26 | 2-methoxy-4-nitraniline | 4,6-dimethyl-7-aminocarbostyril | bordeaux |
| 27 | 37 | 4-methyl-7-chloro-6-aminocarbostyril | brown-red |
| 28 | 2,4,5-trimethyl-aniline | 4-methyl-6-chloro-7-aminocarbostyril | bordeaux |
| 29 | " | 4-methyl-7-aminocarbostyril | blue-red |
| 30 | 4-methoxy-3-amitrifluoromethyl-acid 3'-trifluormethylanilide | 4-methyl-6-chloro-7-amino carbostyril | ruby red |
| 31 | " | 4-methyl-7-chloro-6-aminocarbostyril | bluish red |
| 32 | 4-methoxy-3-aminobenzoic acid 3'-trifluoromethylanilide | 4,6-dimethyl-7-aminocarbostyril | ruby red |
| 33 | 4-methyl-3-amino-benzoic acid 3'-trifluoromethylanilide | " | scarlet |
| 34 | " | 4-methyl-7-chloro-6-amino carbostyril | red |
| 35 | " | 4-methyl-6-chloro-7-aminocarbostyril | red |
| 36 | 4-chloro-3-amino-benzoic acid 2',-4'-dichloroanilide | 4-methyl-7-aminocarbostyril | orange |
| 37 | " | 4,6-dimethyl-7-aminocarbostyril | scarlet |
| 38 | " | 4-methyl-6-chloro-7-aminocarbostyril | scarlet |
| 39 | 4-chloro-3-amino-benzoic acid 2',-4'-dichloranilide | 4-methyl-7-chloro-6-aminocarbostyril | scarlet |

EXAMPLE 2.

18.8 parts of 4,6-dimethyl-7-aminocarbostyril are stirred in 250 parts by volume of N-methylpyrrolidone. 23.5 parts of 2,3-hydroxynaphthoic acid chloride are then introduced at room temperature. The temperature is slowly raised to 40° C., and after a short time a clear solution is obtained. After about 1 hour the condensation product begins to crystallize. The whole is stirred for 6 hours at room temperature, and it is then diluted with 250 parts by volume of methanol and filtered. The filter residue is washed with methanol and then with water. After drying the residue in vacuo at 70° to 75° C., there are obtained 28.5 parts, corresponding to 79.5 percent of the theoretical yield, of the naphthol component of the formula

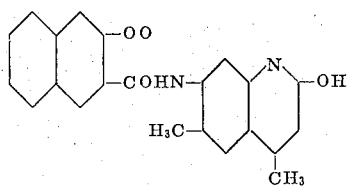

Analysis: Calculated: C=73.73 H=5.50 N=7.81%
Found: C=73.75 H=5.00 N=7.78%

3.2 parts of 2,5-dichloroaniline are diazotised in known manner with 5 parts by volume of hydrochloric acid of 30 percent strength and 5 parts by volume of a 4N-solution of sodium nitrite at 0° to 2° C. The diazo-solution is clarified by filtration, if necessary, and is made up to 200 parts by volume and adjusted to 0° C. After the addition of 10 parts of crystalline sodium acetate, there is introduced dropwise, while stirring, at 20° to 25° C a solution of 7.2 parts of the 2,3-hydroxynaphthoic acid arylide, obtained as described in the preceding paragraph, in 100 parts by volume of dimethylformamide and 25 parts by volume of a 2N-solution of sodium hydroxide. In order to complete the coupling the whole is stirred for 1 hour at 20° to 25° C and is then heated to 80° to 85° C. The whole is filtered while hot, and the dyestuff is washed free from salt with hot water. After drying it in vacuo at 90° to 95° C, there are obtained 9.4 parts (corresponding to 88.7 percent of the theoretical yield) of the dyestuff of the formula

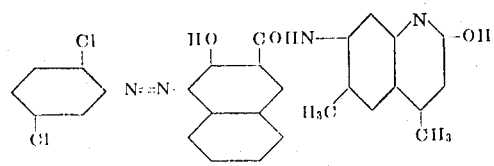

This pigment dyes synthetic plastics, such as polyvinyl chloride, or lacquers, red tints having very good fastness to migration and light. A pigment having better rheological properties is obtained by heating the crude product for a short time in nitrobenzene at 140° to 150° C.

In the following Table are given further pigment dyestuffs which can be obtained in the manner described above by coupling the amines mentioned in column I with the naphthols obtained by condensing 2,3-hydroxynaphthoic acid chloride with the aminocarbostyrils mentioned in Column II. In column III are given the tints produced with these pigments in polyvinyl chloride.

TABLE

| | I | II | III |
|---|---|---|---|
| 1 | 4-methoxy-3-amino-benzoic acid amide | 4,6-dimethyl-7-amino-carbostyril | blue-red |
| 2 | " | 4,5,8-trimethyl-7-aminocarbostyril | bordeaux |
| 3 | " | 4-methyl-7-chloro-6-aminocarbostyril | red |
| 4 | 4-methyl-3-amino benzoic acid amide | " | scarlet |
| 5 | " | 4,6-dimethyl-7-amino-carbostyril | red |
| 6 | 4-methoxy-3-amino benzene-sulpho-N-di-ethylamide | 4-methyl-6-chloro-7-aminocarbostyril | blue-red |
| 7 | " | 4-methyl-7-chloro-6-aminocarbostyril | red |
| 8 | 4-chloro-3-amino-benzoic acid amide | 4-methyl-7-amino-carbostyril | orange |
| 9 | " | 4,6-dimethyl-7-amino-carbostyril | scarlet |
| 10 | 4-amino-3-methyl-benzoic acid amide | 4-methyl-6-chloro-7-aminocarbostyril | red |
| 11 | " | 4-methyl-7-chloro-6-aminocarbostyril | blue-red |
| 12 | " | 4-methyl-5,8-dimethoxy-6-aminocarbostyril | bordeaux |

EXAMPLE 3.

20.85 parts of 4-methyl-6-chloro-7-aminocarbostyril are suspended in 200 parts by volume of glacial acetic acid, and 9 parts of diketen are introduced dropwise at 60° to 65° C., while stirring, in the course of 10 minutes. When the addition is complete the mixture is heated for one hour at 90° to 95° C. The initially very fine white suspension changes into a thick magma of handsome lustrous crystals. After being cooled to room temperature the mixture is filtered with suction, and the filter residue is washed first with acetic acid of 40 percent strength and then with water until the filtrate running out is neutral. By drying the residue in vacuo at 70° to 75° C there are obtained 27.5 parts, corresponding to 94 percent of the theoretical yield, of 4-methyl-6-chloro-7-acetoacetylamino-carbostyril in the form of lustrous colorless needles which melt at 253° C with decomposition.

Analysis: Calculated: C=57.41 H=4.45 Cl=12.14 N=9.58%
Found C=57.43 H=4.38 Cl=12.09 N=9.61%

17.25 parts of 4-chloro-2-nitraniline are diazotised in the usual manner and the clear filtrate of the diazo-solution is adjusted to a volume of 400 parts and a temperature of 0° C. After the addition of 25 parts of crystalline sodium acetate, there is introduced dropwise, while stirring, a solution of 29.5 parts of acetoacetic acid arylide, obtained as described in the preceding paragraph in 150 parts by volume of ethanol, 20 parts of sodium hydroxide of 30 percent strength and 200 parts of water. The whole is stirred for one hour at 20° to 25° C, then heated for a short time at 90° C, filtered, and the filter residue is washed free from salt with hot water. By drying the residue at 90° to 95° C in vacuo there are obtained 46 parts, corresponding to 96.6 percent of the theoretical yield, of the dyestuff of the formula

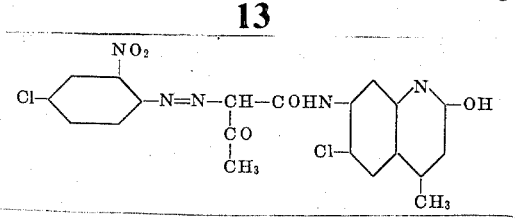

This dyestuff is practically insoluble in the usual solvents. It dyes synthetic plastics and lacquers greenish yellow tints of excellent fastness to migration and light.

In the following Table are given further pigment dyestuffs which can be obtained in the manner described above by coupling the amines mentioned in column I with the aceto-acetyl derivatives obtained by condensing diketen with the aminocarbostyrils mentioned in column II. In column III are given the tints of polyvinyl chloride films colored with the pigments.

| | I | II | III |
|---|---|---|---|
| 1 | 2-nitro-4-chloraniline | 4-methyl-6-methoxy-7-aminocarbostyril | greenish yellow |
| 2 | " | 4-methyl-7-chloro-6-aminocarbostyril | yellow |
| 3 | 2-nitro-4-methylaniline | 4-methyl-7-amino-carbostyril | yellow |
| 4 | " | 4,6-dimethyl-7-aminocarbostyril | reddish yellow |
| 5 | 2-nitro-4-methoxy-aniline | " | reddish yellow |
| 6 | 2,5-dimethoxy-aniline-4-sulphonic acid anilide | 4-methyl-6-methoxy 7-aminocarbostyril | yellow |
| 7 | 4-chloro-3-aminobenzoic acid 2'-methyl-5-chloranilide | 4-methyl-6-chloro-7-aminocarbostyri | greenish yellow |
| 8 | " | 4,6-dimethyl-7-amino-carbostyril | yellow |
| 9 | 4-chloro-3-aminobenzoic acid 2'-chloro-5'-trifluoromethylanilide | 4-methyl-6-methoxy-7-aminocarbostyril | yellow |

EXAMPLE 4.

4.21 parts of the coupling product of 1 mol of tetrazotised 3,3'-dichlorobenzidine and 2 mols of diethylamine are stirred with 5.8 parts of 4-methyl-6-methoxy-7-acetoacetyl-amino-carbostyril in 150 parts by volume of glacial acetic acid, and the whole is heated to 100° to 110° C. The whole is stirred at that temperature for 4 hours, then filtered while hot, and the separated pigment is washed with hot ortho-dichlorobenzene and then with methanol. After drying it at 90° to 95° C in vacuo there are obtained 6.8 parts, corresponding to 87.2 percent of the theoretical yield, of the yellow pigment dyestuff of the formula

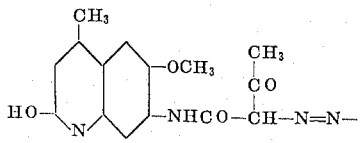

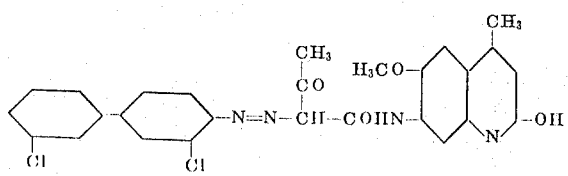

It dyes synthetic plastics, such as polyvinyl chloride, strong reddish yellow tints of very good fastness to migration and light.

In the following Table are given further pigment dyestuffs which can be obtained in the manner described above or by the usual methods by direct coupling of the components, by diazotising the diamines mentioned column I and, if desired after converting them into their diazo-amino compounds, coupling them with the naphthols obtained by condensing diketen with the carbostyrils mentioned in column II. In column III are given the tints of polyvinyl chloride films colored with the pigments.

| | I | II | III |
|---|---|---|---|
| 1 | 3,3'-dichlorobenzidine | 4-methyl-6-chloro-7-acetoacetylamino carbostyril | reddish yellow |
| 2 | 3,3',6,6'-tetrachloro-benzidine | " | yellow |
| 3 | 3,3'-dimethoxy-6,6'-dichlorobenzidine | " | yellow |
| 4 | 3,3'-dimethoxy-benzidine | " | orange |
| 5 | 3,3'-dichlorobenzidine | 4,6-dimethyl-7-acetoacetylamino carbostyril | reddish yellow |
| 6 | 3,3',6,6'-tetrachloro-benzidine | " | yellow |
| 7 | 3,3'-dichlorobenzidine | 4-methyl-7-chloro-6-acetoacetylamino-carbostyril | reddish yellow |
| 8 | 3,3'6,6'-tetrachloro benzidine | " | yellow |
| 9 | 3,3'-dimethyl-6,6'-dichlorobenzidine | " | reddish yellow |
| 10 | 3,3'-dimethoxy-6,6'-dichlorobenzidine | " | yellow |
| 11 | 3,3'-dimethoxy-benzidine | " | orange |

EXAMPLE 5.

65 parts of stabilized polyvinyl chloride, 35 parts of dioctyl phthalate and 0.2 part of the pigment obtained as described in paragraphs 1 and 2 of Example 1 are mixed together and then rolled backwards and forwards on a two-roller calender for 7 minutes at 140° C. There is obtained a bluish red film of very good fastness to light and migration.

What we claim is:

1. A monoazo-dyestuff pigment of the formula

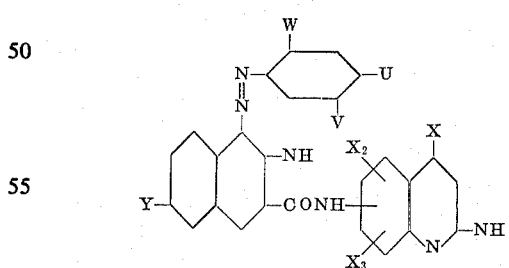

in which W represents chloro, bromo, fluoro, lower alkyl, lower alkoxy, carboethoxyphenoxy, phenoxy, chlorophenoxy, nitro or $C_{1-2}$ lower carbalkoxy, U represents hydrogen, methoxy, ethoxy, carbophenoxy, carboxamido, methyl, chloro, bromo, nitro or trifluoromethyl, V represents hydrogen, chloro, bromo, methyl, nitro, methoxy, $C_{1-2}$ carbalkoxy, carbophenoxy, carboxamido, N-$C_{1-2}$ alkyl carboxamido, trifluoromethyl unsubstituted carboxylic phenylamido, substituted carboxylic phenylamido wherein the substituents are selected from the group consisting of chloro, methyl, phenyl and trifluoromethyl; sulfonamido, sulfonic ethylamido, sulfonic phenylamido, substituted sulfonic phenylamido wherein the substituents are selected from the group consisting of chloro and trifluoromethyl, $X_1$ represents hydrogen, lower alkyl or phenyl, $X_2$ and $X_3$ each represents hydrogen, chloro, lower alkyl, phenyl or lower alkoxy, or together with the two adjacent carbon atoms of the benzene ring which they occupy a further unsubstituted benzene ring and Y represents hydrogen, bromo, lower alkoxy, nitro or cyano and in which the NH- group is bound in the 6- or 7-position of the carbostyril radical.

2. The compound as claimed in claim 1 of the formula

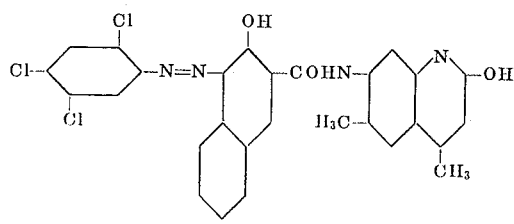

3. The compound as claimed in claim 1 of the formula

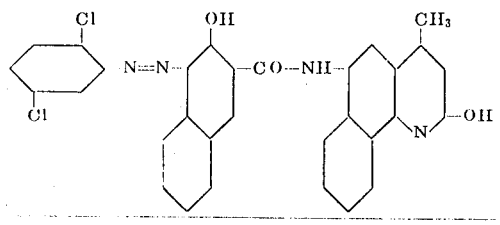

4. The compound as claimed in claim 1 of the formula

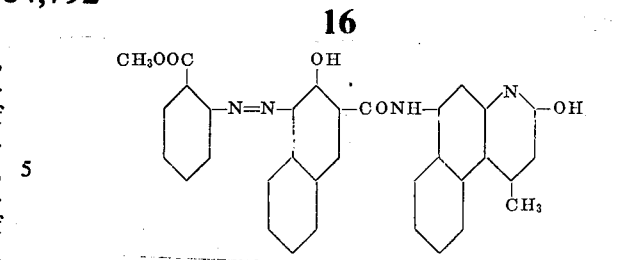

5. The compound as claimed in claim 1 of the formula

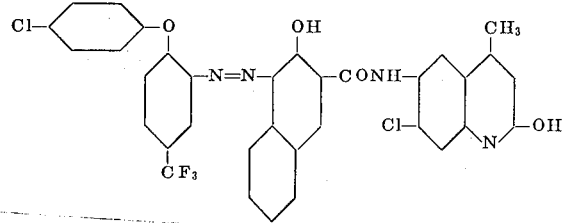

6. The compound as claimed in claim 1 of the formula

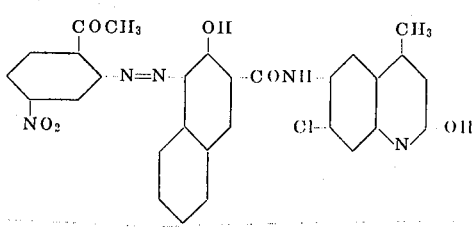

7. The compound as claimed in claim 1 of the formula

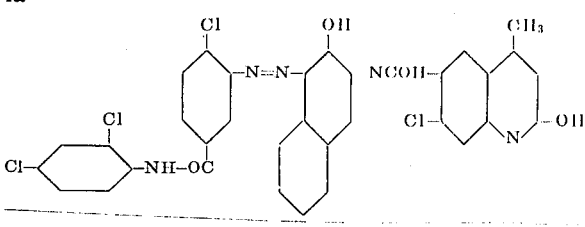

* * * * *

PO-1050
(5/69)

UNITED STATES PATENT OFFICE
CERTIFICATE OF CORRECTION

Patent No. 3,684,792            Dated August 15, 1972

Inventor(s) WILLY MUELLER

It is certified that error appears in the above-identified patent and that said Letters Patent are hereby corrected as shown below:

Cover Page, after the Inventors and before "[22]" insert ---Assignors to CIBA-GEIGY AG, Basle, Switzerland---.

Signed and sealed this 16th day of April 1974.

(SEAL)
Attest:

EDWARD M. FLETCHER, JR.
Attesting Officer

C. MARSHALL DANN
Commissioner of Patents glp